(12) United States Patent
Yu et al.

(10) Patent No.: US 11,388,647 B2
(45) Date of Patent: Jul. 12, 2022

(54) TRANSMISSION METHOD AND DEVICE

(71) Applicant: HUAWEI TECHNOLOGIES CO., LTD., Guangdong (CN)

(72) Inventors: Yinghui Yu, Beijing (CN); Yan Wang, Beijing (CN); Baokun Shan, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 161 days.

(21) Appl. No.: 16/810,046

(22) Filed: Mar. 5, 2020

(65) Prior Publication Data
US 2020/0213931 A1 Jul. 2, 2020

Related U.S. Application Data

(63) Continuation of application No. PCT/CN2017/101122, filed on Sep. 8, 2017.

(51) Int. Cl.
*H04W 40/22* (2009.01)
*H04W 76/10* (2018.01)
*H04W 74/08* (2009.01)
*H04W 84/04* (2009.01)

(52) U.S. Cl.
CPC ....... *H04W 40/22* (2013.01); *H04W 74/0833* (2013.01); *H04W 76/10* (2018.02); *H04W 84/047* (2013.01)

(58) Field of Classification Search
CPC . H04W 40/22; H04W 76/10; H04W 74/0833; H04W 84/047
See application file for complete search history.

(56) References Cited

U.S. PATENT DOCUMENTS

| 9,949,146 B1 * | 4/2018 | Velusamy | H04W 8/082 |
| 10,028,186 B1 * | 7/2018 | Marupaduga | H04W 36/26 |
| 10,148,340 B1 * | 12/2018 | Bales | H04W 76/25 |

(Continued)

FOREIGN PATENT DOCUMENTS

| CN | 102469536 A | 5/2012 |
| CN | 104247328 A | 12/2014 |

(Continued)

OTHER PUBLICATIONS

Veolia, "New WID on Multi hop relay for IoT and MTC for utilities use cases for LTE", 3GPP TSG RAN Meeting #77 RP-171882,Sep. 4, 2017.

(Continued)

*Primary Examiner* — Brenda H Pham
(74) *Attorney, Agent, or Firm* — Womble Bond Dickinson (US) LLP

(57) ABSTRACT

This application provides a transmission method and device. The method includes: receiving, by a first device, a first RRC message sent by a second device, where the first RRC message includes first data and identification information, (Continued)

and then sending, by the first device, the first data and the identification information to a donor eNB of the first device by using a second RRC message. Because the first device and the second device send data by using an RRC message, network functions of the first device and the second device are simplified, and data transmission efficiency is increased after a plurality of relay nodes access an NB-IoT network.

15 Claims, 10 Drawing Sheets

(56) References Cited

U.S. PATENT DOCUMENTS

| | | | | |
|---|---|---|---|---|
| 2010/0046418 | A1* | 2/2010 | Horn | H04W 40/22 |
| | | | | 370/315 |
| 2010/0260096 | A1* | 10/2010 | Ulupinar | H04W 92/20 |
| | | | | 370/315 |
| 2012/0002591 | A1* | 1/2012 | Noh | H04W 72/0426 |
| | | | | 370/315 |
| 2012/0002592 | A1* | 1/2012 | Yang | H04W 76/10 |
| | | | | 370/315 |
| 2012/0243462 | A1 | 9/2012 | Bucknell et al. | |
| 2013/0329629 | A1* | 12/2013 | Bao | H04W 36/00835 |
| | | | | 370/315 |
| 2015/0043490 | A1* | 2/2015 | Wu | H04W 74/0833 |
| | | | | 370/329 |
| 2015/0131578 | A1* | 5/2015 | Baek | H04W 72/0406 |
| | | | | 370/329 |
| 2017/0223766 | A1* | 8/2017 | Lin | H04W 36/0061 |

FOREIGN PATENT DOCUMENTS

| | | |
|---|---|---|
| CN | 106954233 A | 7/2017 |
| EP | 3107342 A1 | 12/2016 |
| GB | 2484347 A | 4/2012 |
| WO | 2012003615 A1 | 1/2012 |
| WO | 2014205772 A1 | 12/2014 |
| WO | 2016164808 A1 | 10/2016 |
| WO | 2017065895 A1 | 4/2017 |

OTHER PUBLICATIONS

3GPP TR 36.806 V2.0.0: 3rd Generation Partnership Project; Technical Specification Group Radio Access Network; Evolved Universal Terrestrial Radio Access (E-UTRA); Relay architectures for E-UTRA (LTE-Advanced) (Release 9) Feb. 2010 total 34 pages.
3GPP TS 23.401 V15.0.0: 3rd Generation Partnership Project; Technical Specification Group Services and System Aspects;General Packet Radio Service (GPRS) enhancements forEvolved Universal Terrestrial Radio Access Network (E-UTRAN) access(Release 15) Jun. 2017 total 386 pages.

* cited by examiner

TRANSMISSION METHOD AND DEVICE

CROSS-REFERENCE TO RELATED APPLICATIONS

This application is a continuation of International Application No. PCT/CN2017/101122, filed on Sep. 8, 2017, the disclosure of which is hereby incorporated by reference in its entirety.

TECHNICAL FIELD

This application relates to the field of internet of things communications technologies, and in particular, to a transmission method and device.

BACKGROUND

With rapid development of wireless communication, human-to-human communications can no longer meet requirements of people. An internet of things (IoT) technology emerges, and a market demand of the internet of things technology increases rapidly. IoT devices are usually small and battery-powered systems, for example, an intelligent meter reading system that needs to periodically monitor and report usage of water, electricity, gas, and the like. These devices are usually deployed in places with poor radio signal coverage, for example, in a basement or on a wall. Therefore, coverage enhancement is a basic design requirement during a design of an IoT communications system, and 20 dB coverage enhancement needs to be achieved in terms of interface single-hop.

The 20 dB coverage enhancement of the interface single-hop of IoT can meet coverage requirements in most scenarios. However, in some special scenarios, for example, a multi-floor distributed scenario such as a building, if a base station is located on a rooftop, an IoT device on a floor near the base station can be served, but an IoT device on a floor far away from the base station cannot be served. There are also some other scenarios. For example, some gas meters are located under the relatively deep ground, and cannot be reached by one hop. However, in these scenarios, deployment of a wired backhaul link is also relatively difficult. In this case, a possible solution is to use a radio access node with low power consumption as a multi-hop relay.

Currently, in a long term evolution (LTE) standard, a transmission solution of two-hop relay has already been supported, and a network architecture of the two-hop relay may be shown in FIG. 1. It can be seen from FIG. 1 that the network architecture includes a relay node (RN), an eNB (eNodeB), a donor eNB (DeNB), and a mobility management entity (MME) or a service gateway (S-GW). The RN is connected to the DeNB through a Un interface, and the Un interface supports X2 and S1 protocols. Currently, an RN in an LTE network is a combination of network functions of one base station and one UE. Implementation of multi-hop relay by using the RN in an NB-IoT network is also feasible. However, based on an existing network function, the RN further needs to be responsible for a network function of a DeNB of a previous-hop relay node. Therefore, a network function of the RN in the NB-IoT network is more complex than a network function of the RN in the LTE network, and a requirement of an NB-IoT network with a simple deployment requirement for the RN cannot be met. Therefore, a relay node with a simple network function needs to be urgently introduced.

SUMMARY

This application provides a transmission method and device, to increase data transmission efficiency after a plurality of relay nodes access an NB-IoT network.

According to a first aspect, a transmission method is provided, including:

receiving, by a first device, a first radio resource control (RRC) message sent by a second device, where the first RRC message includes first data and identification information, the first data is data to be sent to a network device, the first device is a first relay node that accesses a donor eNB, the second device is a second relay node or a terminal device, and the identification information is identification information of the terminal device or identification information of the relay node; and sending, by the first device, the first data and the identification information to the donor eNB of the first device by using a second RRC message.

Because the first device and the second device send data by using an RRC message, network functions of the first device and the second device are simplified, and data transmission efficiency is increased after a plurality of relay nodes access an NB-IoT network.

In one embodiment, before the sending, by the first device, the first data and the identification information to the donor eNB of the first device by using a second RRC message, the method further includes: determining, by the first device based on the identification information, the donor eNB of the first device corresponding to the identification information, and sending, by the first device, the first data and the identification information to the donor eNB of the first device by using the second RRC message.

The donor eNB of the first device corresponding to the identification information is obtained by using the identification information. In this way, a destination to which data needs to be transmitted can be learned, so that data transmission efficiency can be increased.

In one embodiment, the first data is a non-access stratum protocol data unit (NAS PDU) sent by the terminal device to the network device.

In one embodiment, the second relay node is a relay node accessed by the terminal device.

In one embodiment, before the receiving, by a first device, a first RRC message sent by a second device, the method further includes: determining, by the first device, a cell of the donor eNB as a serving cell based on strength and/or quality of an interface radio signal of the donor eNB or configured serving cell information; initiating, by the first device, random access to the serving cell to set up an RRC connection to the donor eNB; and receiving, by the first device, configuration information sent by the donor eNB, and configuring a cell of the first device based on the configuration information.

The first device is registered with the donor eNB and obtains the configuration information sent by the donor eNB, to complete configuration of the first device. In this way, support for increasing data transmission efficiency after a plurality of relay nodes access an NB-IoT network is provided.

In one embodiment, before the receiving, by a first device, a first RRC message sent by a second device, the method further includes: receiving, by the first device, an RRC connection request message initiated by the second device, and setting up an RRC connection to the second device.

In one embodiment, when the identification information is the identification information of the relay node, the first RRC message further includes a relay indication, and the relay indication is used to notify the network device and/or the donor eNB that the second device is a relay node.

According to a second aspect, a transmission method is provided, including:

obtaining, by a second device, first data and identification information, where the first data is data to be sent to a network device, the identification information is identification information of the terminal device or identification information of a relay node, the second device is a second relay node or the terminal device; and sending, by the second device, a first RRC message to a first device, where the first RRC message includes the first data and the identification information, and the first device is a first relay node that accesses a donor eNB.

Because the first device and the second device send data by using an RRC message, network functions of the first device and the second device are simplified, and data transmission efficiency is increased after a plurality of relay nodes access an NB-IoT network.

In one embodiment, when the second device is the second relay node, the obtaining, by a second device, first data includes: obtaining, by the second device, the first data generated by the second relay node, or receiving, by the second device, the first data sent by the terminal device.

In one embodiment, the second relay node is a relay node accessed by the terminal device.

In one embodiment, when the second device is the terminal device, the obtaining, by a second device, first data includes: obtaining, by the second device, the first data generated by the terminal device.

According to a third aspect, a transmission device is provided, including a receiving unit and a sending unit, where the receiving unit is configured to receive a first RRC message sent by a second device, where the first RRC message includes first data and identification information, the first data is data to be sent to a network device, the transmission device is a first device, the first device is a first relay node that accesses a donor eNB, the second device is a second relay node or the terminal device, the second device accesses the first device, and the identification information is identification information of the terminal device or identification information of the relay node; and the sending unit is configured to send the first data and the identification information that are received by the receiving unit to the donor eNB of the first device by using a second RRC message.

In one embodiment, the first data is a NAS PDU sent by the terminal device to the network device.

In one embodiment, the transmission device further includes a processing unit, where the processing unit is configured to: before the sending unit sends the first data and the identification information that are received by the receiving unit to the donor eNB of the first device by using the second RRC message, determine, based on the identification information received by the receiving unit, the donor eNB of the first device corresponding to the identification information.

In one embodiment, the second relay node is a relay node accessed by the terminal device.

In one embodiment, the processing unit is further configured to: determine a cell of the donor eNB as a serving cell based on strength and/or quality of an interface radio signal of the donor eNB or configured serving cell information; and initiate random access to the serving cell to set up an RRC connection to the donor eNB;

the receiving unit is further configured to receive configuration information sent by the donor eNB; and the processing unit is further configured to configure a cell of the transmission device based on the configuration information received by the receiving unit.

In one embodiment, before the receiving unit receives the first RRC message sent by the second device, the receiving unit is further configured to receive an RRC connection request message initiated by the second device; and the processing unit is further configured to set up an RRC connection to the second device.

In one embodiment, when the identification information is the identification information of the relay node, the first RRC message further includes a relay indication, and the relay indication is used to notify the network device and/or the donor eNB that the second device is a relay node.

According to a fourth aspect, a transmission device of multi-link relay is provided, including a sending unit and a processing unit, where the processing unit is configured to obtain first data and identification information, where the first data is data to be sent to a network device, the identification information is identification information of the terminal device or identification information of a relay node, and the transmission device is the second relay node or the terminal device; and the sending unit is configured to send a first RRC message to a first device, where the first RRC message includes the first data and the identification information that are obtained by the processing unit, and the first device is a relay node that accesses a donor eNB.

In one embodiment, the transmission device further includes a receiving unit, where the processing unit is configured to: when the transmission device is the second relay node, obtain the first data generated by the second relay node; or the processing unit controls the receiving unit to receive the first data sent by the terminal device.

In one embodiment, the processing unit is configured to: when the transmission device is the terminal device, obtain the first data generated by the terminal device.

According to a fifth aspect, this application proposes a transmission device, including a communications interface, a processor, and a memory. The memory is configured to store a software program. The processor is configured to read the software program stored in the memory, send and receive data through the communications interface, and implement the method according to the first aspect or any embodiment of the first aspect.

According to a sixth aspect, this application proposes a transmission device, including a communications interface, a processor, and a memory. The memory is configured to store a software program. The processor is configured to read the software program stored in the memory, send and receive data through the communications interface, and implement the method according to the second aspect or any embodiment of the second aspect.

According to a seventh aspect, this application provides a communications system, including a first device, a second device, and a donor eNB, where the first device is a first relay node that accesses the donor eNB, and the second device is the second relay node or a terminal device;

the second device obtains first data and identification information, where the first data is data to be sent to a network device, the identification information is identification information of the terminal device or identification information of the relay node; and the second device sends a first RRC message to the first device, where the first RRC message includes the first data and the identification information; and the first device receives the first RRC message sent by the second device, and sends the first data and the identification information to the donor eNB of the first device by using a second RRC message.

According to an eighth aspect, this application provides a computer-readable storage medium, including a computer-readable instruction, where when a computer reads and executes the computer-readable instruction, the computer is enabled to perform the method according to any embodiment of the first aspect.

According to a ninth aspect, this application provides a computer-readable storage medium, including a computer-readable instruction, where when a computer reads and executes the computer-readable instruction, the computer is enabled to perform the method according to any embodiment of the second aspect.

According to a tenth aspect, this application provides a computer program product, including a computer-readable instruction, where when a computer reads and executes the computer-readable instruction, the computer is enabled to perform the method according to any embodiment of the first aspect.

According to an eleventh aspect, this application provides a computer program product, including a computer-readable instruction, where when a computer reads and executes the computer-readable instruction, the computer is enabled to perform the method according to any embodiment of the second aspect.

DESCRIPTION OF EMBODIMENTS

To make the objectives, technical solutions, and advantages of this application clearer, the following further describes this application in detail with reference to the accompanying drawings.

Figure 1:
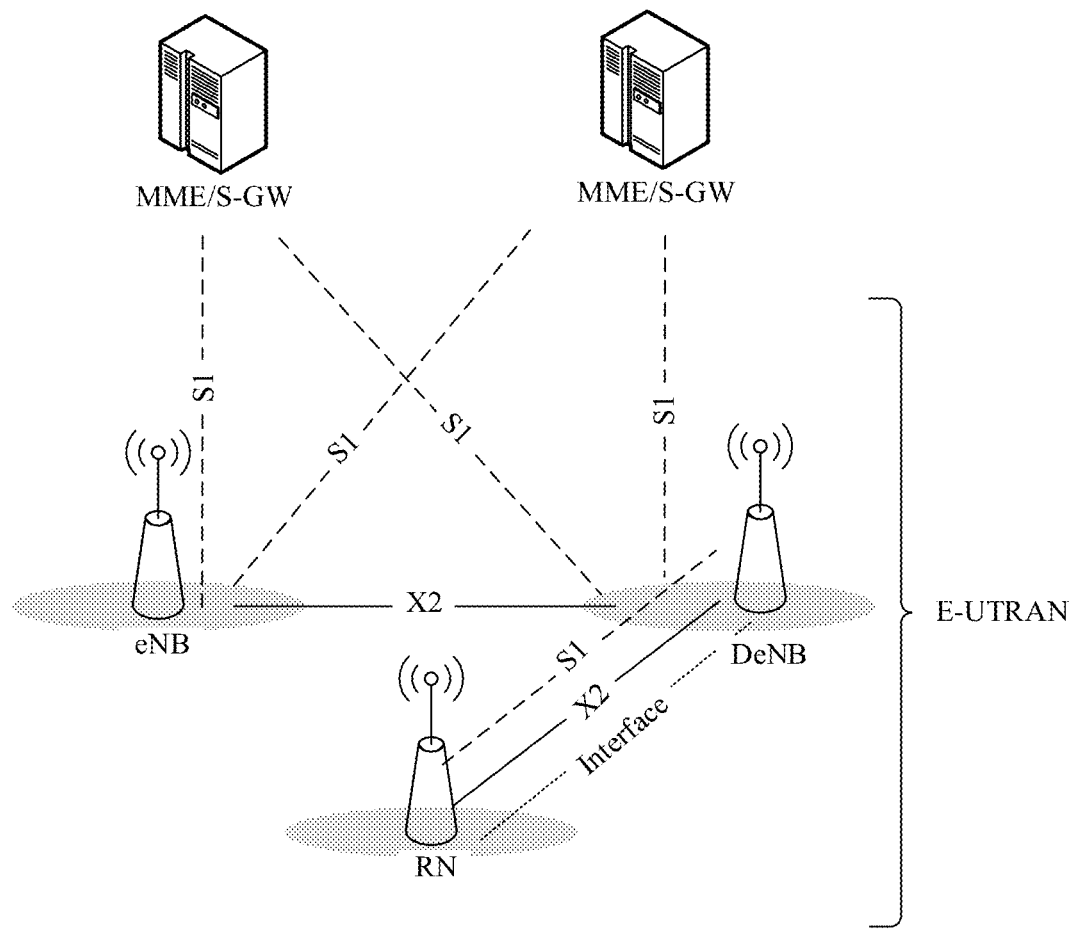
FIG. 1 is a schematic structural diagram of a network architecture according to this application.
Figure 2:
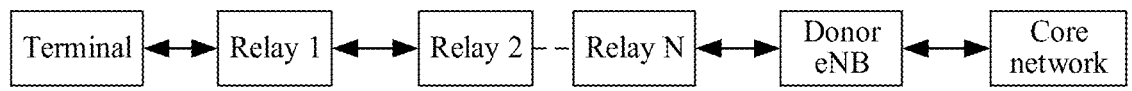
FIG. 2 is a schematic structural diagram of a communications network system according to this application.

This application provides a transmission method, and the method may be applied to a communications network system. FIG. 2 is a possible structural diagram of a communications network system according to this application. As shown in FIG. 2, the communications network system includes a terminal device, a plurality of relay nodes, a donor eNB, and a network device.

The terminal device may be a device with a wireless transceiver function. The terminal device may be deployed on land, including an indoor or outdoor device, a handheld device, a wearable device, or a vehicle-mounted device, or may be deployed on water (for example, on a steamship), or may be deployed in the air (for example, on an airplane, on a balloon, or on a satellite). The terminal device may be a mobile phone, an internet of things (IoT) terminal device, a tablet computer (Pad), a computer having a wireless transceiver function, a virtual reality (VR) terminal device, an augmented reality (AR) terminal device, a wireless terminal related to industrial control, a wireless terminal related to self driving, a wireless terminal related to remote medical, a wireless terminal related to a smart grid, a wireless terminal related to transportation safety, a wireless terminal related to a smart city, a wireless terminal related to a smart home, or the like. An application scenario is not limited in the embodiments of this application. The terminal device may sometimes be referred to as user equipment (UE), an access terminal device, a UE unit, a UE station, a mobile station, a mobile console, a remote station, a remote terminal device, a mobile device, a UE terminal device, a terminal device, a wireless communications device, a UE agent, a UE apparatus, or the like.

One or more relay nodes are located between the terminal device and the donor eNB, to provide nodes of a wireless access link and a wireless backhaul link.

The donor eNB is a network element configured to connect the terminal device, the relay nodes, and the network device, and may be any device that has a wireless transceiver function. The donor eNB includes but is not limited to: a NodeB, an evolved NodeB (eNodeB), a gNB in a fifth generation (5G) communications system, a base station or a network device in a future communications system, an access node in a wireless fidelity (WiFi) system, a wireless relay node, a wireless backhaul node, or the like.

The network device is connected to the donor eNB, and the network device preferably uses a core network, or may be another device, for example, an internet of things serving gateway (CIoT serving gateway node, C-SGN), a mobility management entity (MME), a serving gateway (S-GW), a public data network gateway (P-GW), a home subscriber server (HSS), a serving GPRS support node (SGSN), an access and mobility management function (AMF), a user plane function (UPF), a 5G core network (next generation core, NGC), operation, administration, and maintenance (OAM), or a remote server.

It should be noted that the term "a plurality of" in this application means two or more. In view of this, the term "a plurality of" in this application may also be understood as "at least two". The term "and/or" describes an association relationship of associated objects and represents that three relationships may exist. For example, A and/or B may represent the following three cases: Only A exists, both A and B exist, and only B exists. In addition, the character "/" generally indicates an "or" relationship between the associated objects unless otherwise noted.

The following describes a transmission method according to this application with reference to the accompanying drawings.

Figure 3:
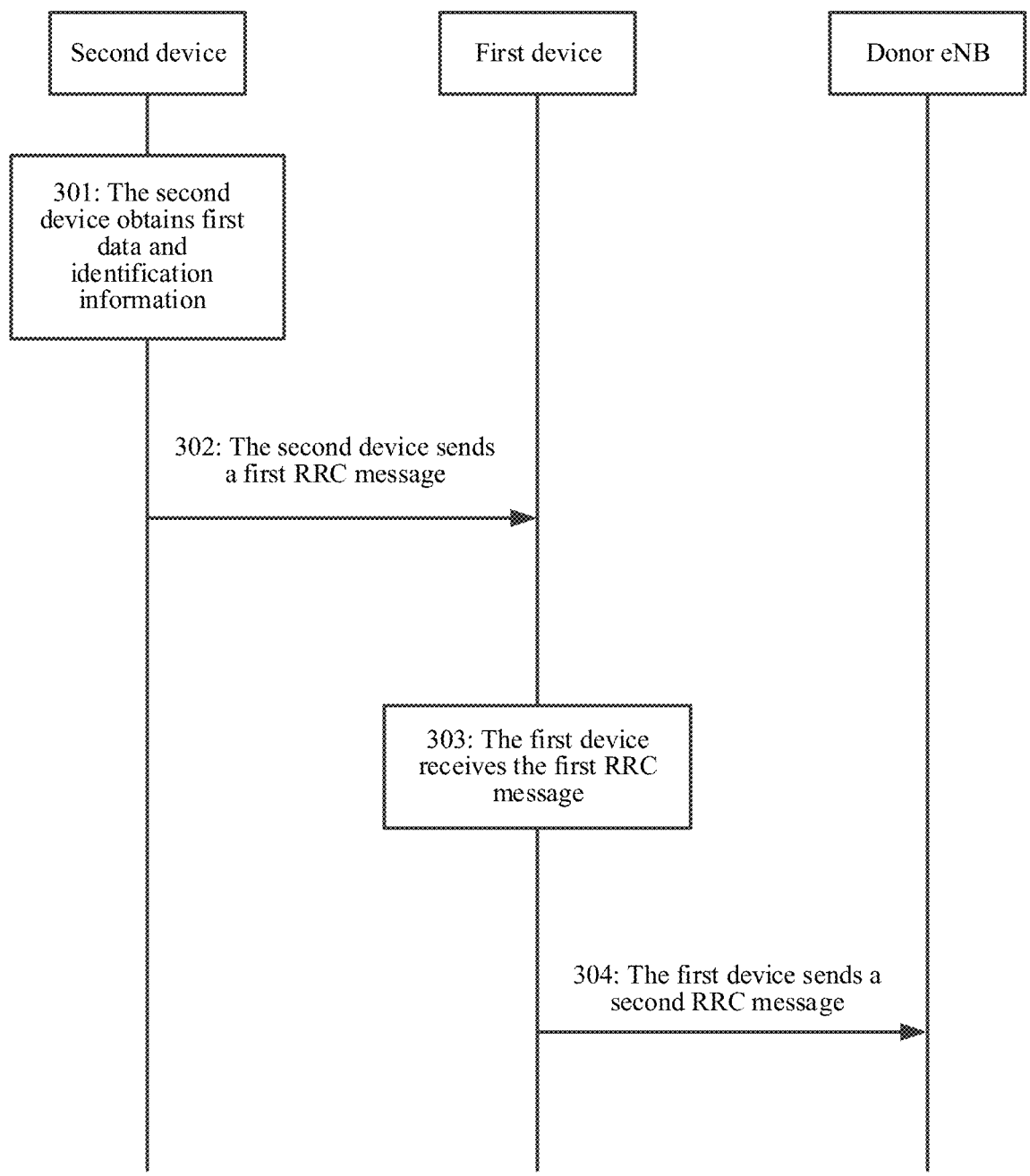
FIG. 3 is a schematic flowchart of a transmission method according to this application.

FIG. 3 is a flowchart of a transmission method according to this application. The transmission method includes the following operations.

Operation 301: A second device obtains first data and identification information.

In this application, the first data is data to be sent to a network device, the identification information is identification information of a terminal device or identification information of a relay node, and the second device is a second relay node or the terminal device. In this application, there may be a plurality of second relay nodes. The terminal device accesses one of the second relay nodes, and then accesses a first device by using the plurality of second relay nodes, where the first device is a first relay node that accesses a donor eNB.

When the second device is the second relay node, that a second device obtains first data may be: The second device obtains the first data generated by the second relay node, or the second device receives the first data sent by the terminal device. When the second device obtains the first data generated by the second device, the second relay node may notify, by using the first device in a process in which the second relay node accesses a network after the second relay node is powered on, the network device of data used to request to obtain configuration information of the second relay node, or may perform data interaction with the network device by using the first device in a running process of the relay node. When the second device receives the first data sent by the terminal device, the first data is data sent by the terminal device to the network device.

When the second device is the terminal device, that a second device obtains first data includes: The second device obtains the first data generated by the terminal device, where the first data may be finally sent by the terminal device to the network device by using the first device.

It should be noted that in this application, the first data may be a non-access stratum protocol data unit (NAS PDU) sent by the terminal device to the network device.

Operation 302: The second device sends a first radio resource control (RRC) message.

After obtaining the first data and the identification information, the second device sends the first RRC message to the first device, where the first RRC message includes the first data and the identification information.

Figure 4:
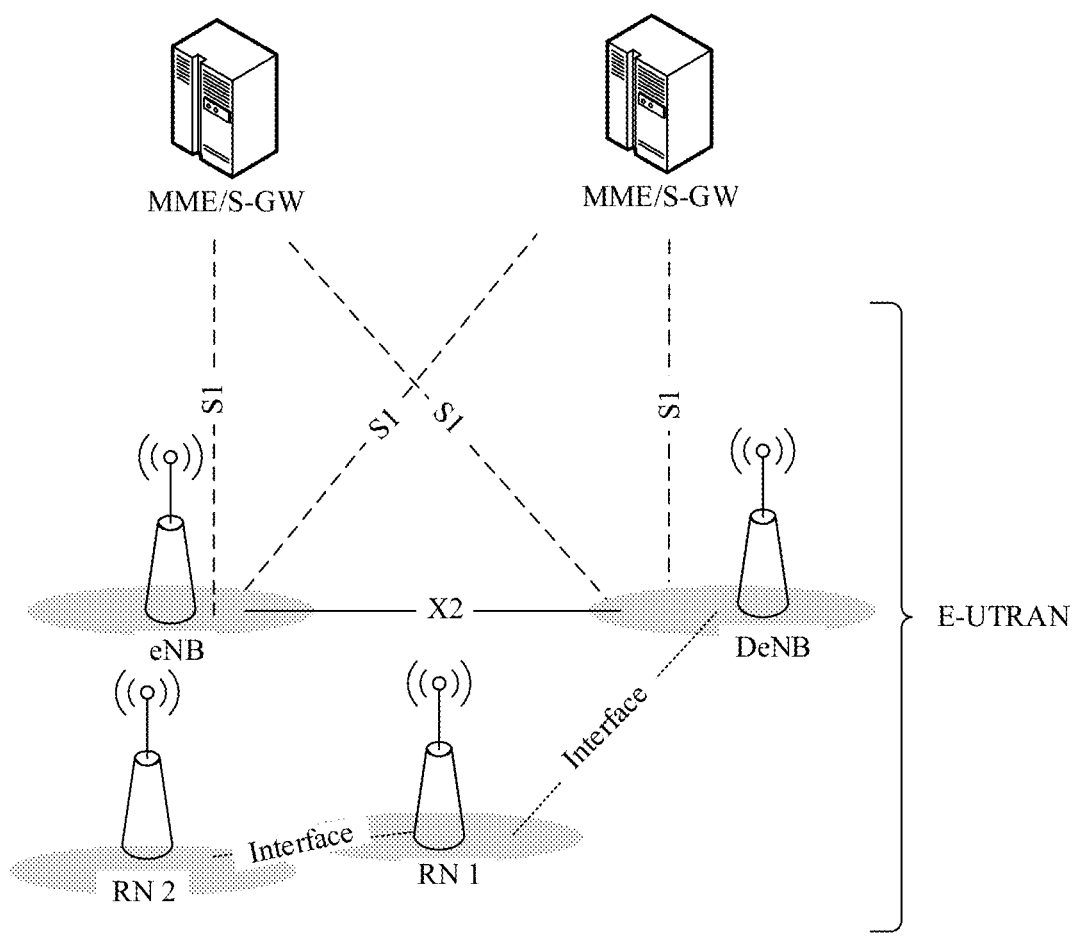
FIG. 4 is a schematic structural diagram of a network architecture according to this application.

FIG. 4 shows an example of a network architecture supporting two relay nodes according to this application. For ease of description, this application is described by using the two relay nodes as an example. A network architecture with more than two relay nodes is similar to the network architecture with the two relay nodes, and details are not described in this application.

As shown in FIG. 4, a relay node (RN) 1 is a first device, an RN 2 is a second device, and a DeNB is a donor eNB. An interface connection is supported between the RN 1 and the RN 2. In one embodiment, an interface protocol (for example, Xn or X2) between base stations and an interface protocol (for example, NG or S1) between a base station and a core network may not be supported between the RN 1 and the RN 2. Such a structure enables a function of the network structure to which the transmission method provided in this application is applicable to be simpler.

Figure 5:
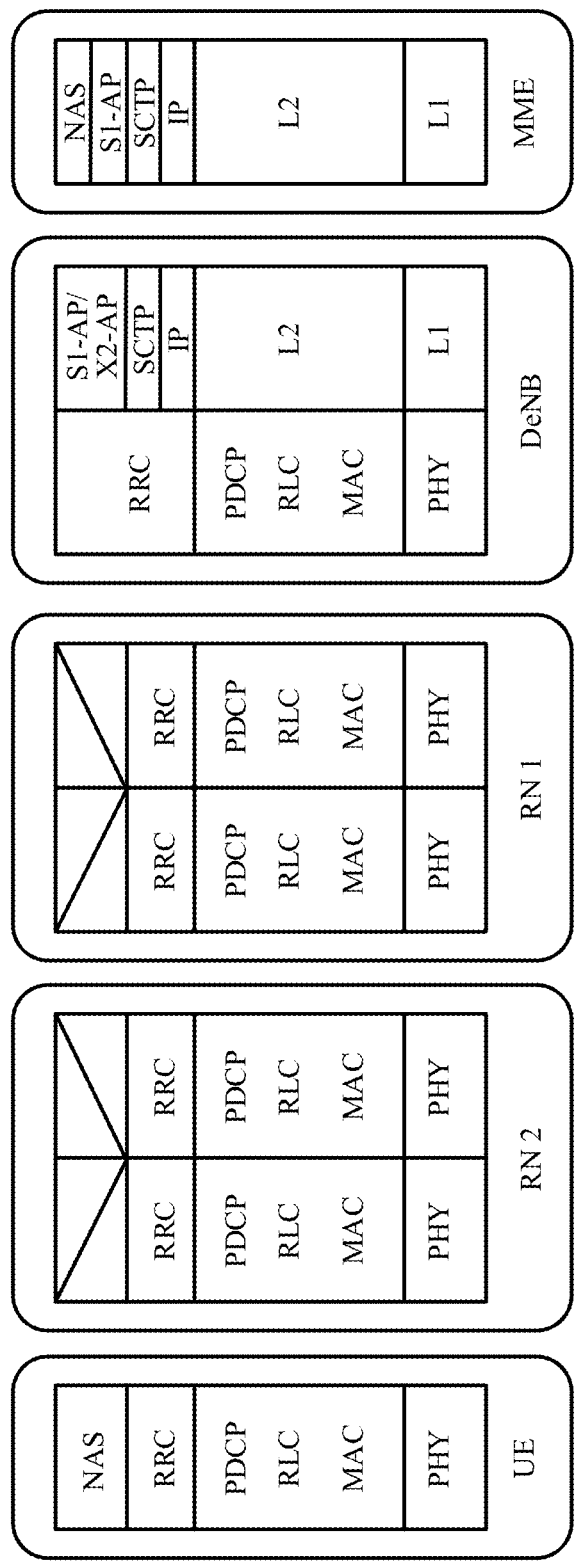
FIG. 5 is a schematic structural diagram of a protocol stack according to this application.

FIG. 5 shows an architecture of a protocol stack supported by devices in the network structure shown in FIG. 4. As shown in FIG. 5, UE supports a NAS layer, an RRC layer, a packet data convergence protocol (PDCP) layer, a radio link control (RLC) protocol layer, a media access control (MAC) layer, and a physical (PHY) layer. The RN 1 and the RN 2 each support an RRC layer, an RLC layer, a MAC layer, and a PHY layer on an interface oriented to the UE, where a PDCP layer is optional. The RN supports an RRC layer, an RLC layer, a MAC layer, and a PHY layer on an interface oriented to an upper-level RN or the DeNB, where a PDCP layer is optional. The DeNB supports an RRC layer, a PDCP layer, an RLC layer, a MAC layer, and a PHY layer on an interface oriented to the RNs, and supports an S1-AP/NG-AP layer, an SCTP layer, an IP layer, a layer 2 (L2), and a layer 1 (L1) on an interface oriented to the core network. The core network supports an S1-AP/NG-AP layer, an SCTP layer, an IP layer, an L2, and an L1 on an interface oriented to the DeNB. In addition, the core network supports a NAS layer.

Figure 6A:
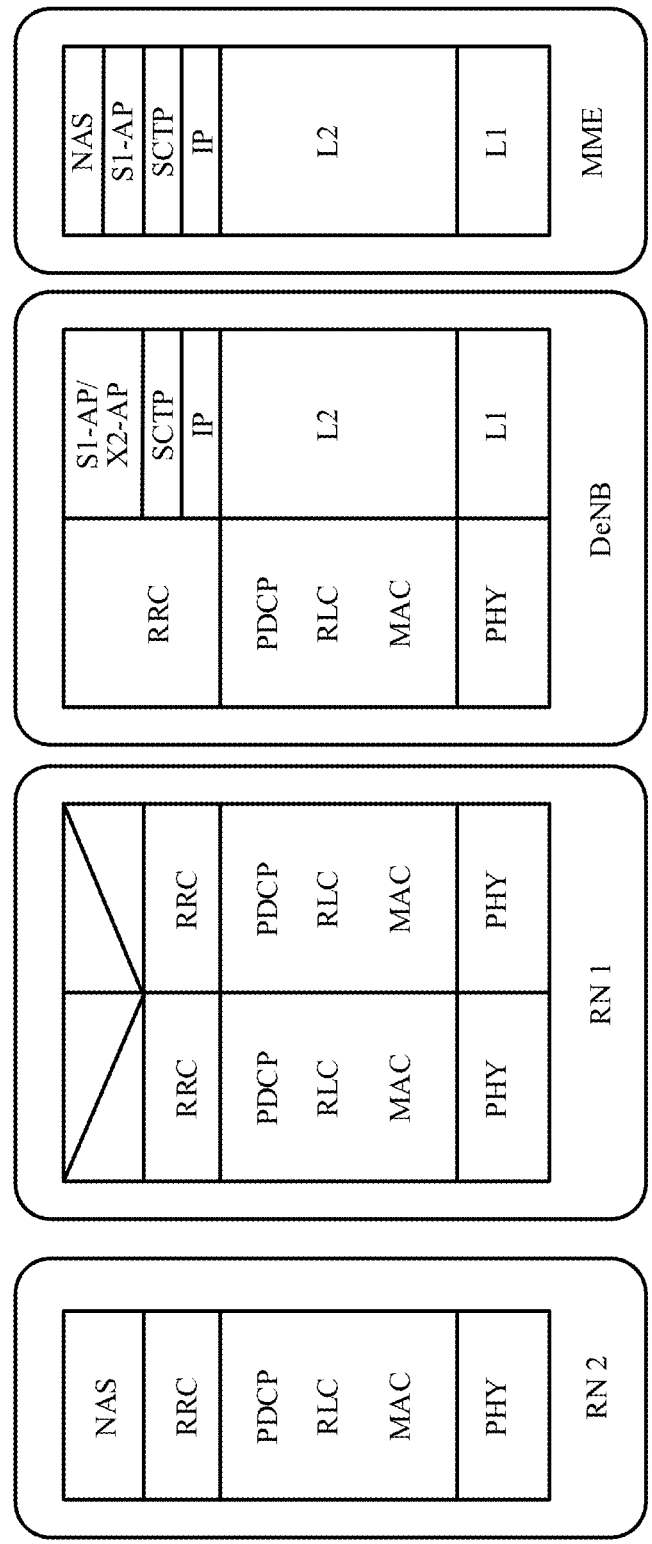
FIG. 6a is a schematic structural diagram of a protocol stack according to this application.
Figure 6B:
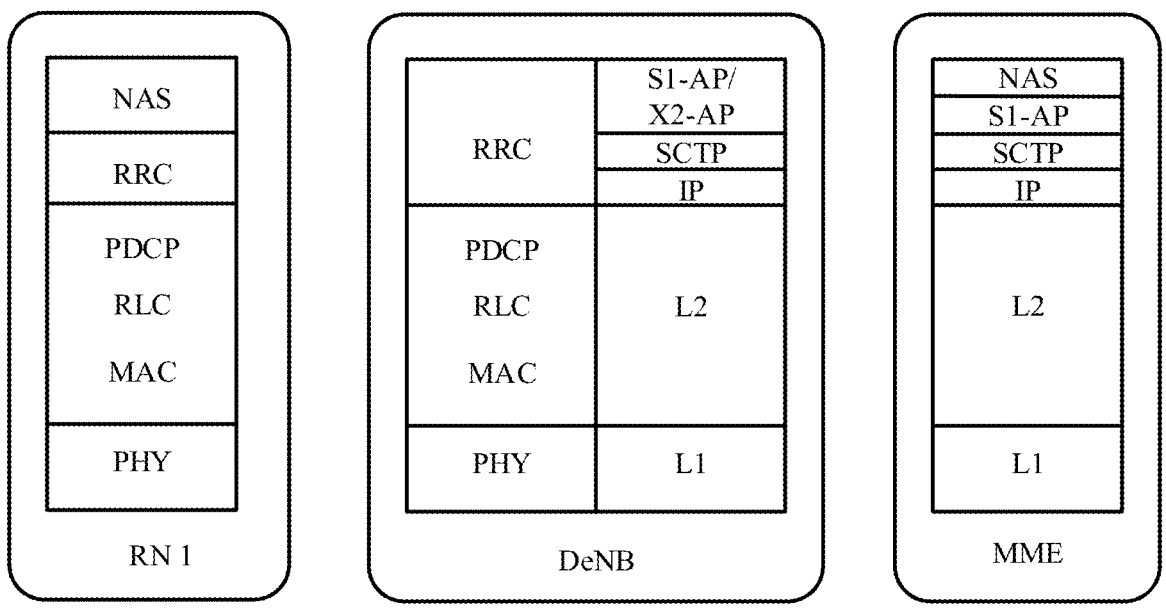
FIG. 6b is a schematic structural diagram of a protocol stack according to this application.

When RNs access a network as UEs, a protocol stack supported by the RNs is different from a protocol stack supported by the RNs shown in FIG. 5. Details are shown in FIG. 6a and FIG. 6b. When an RN 2 and an RN 1 access the network as UEs, the RN 2 and the RN 1 each support a NAS layer, an RRC layer, a PDCP layer, an RLC layer, a MAC layer, and a PHY layer. A protocol stack supported by an interface of the upper-level RN 1 of the RN 2 or a DeNB is the same as that in FIG. 5, and details are not described herein.

Figure 7:
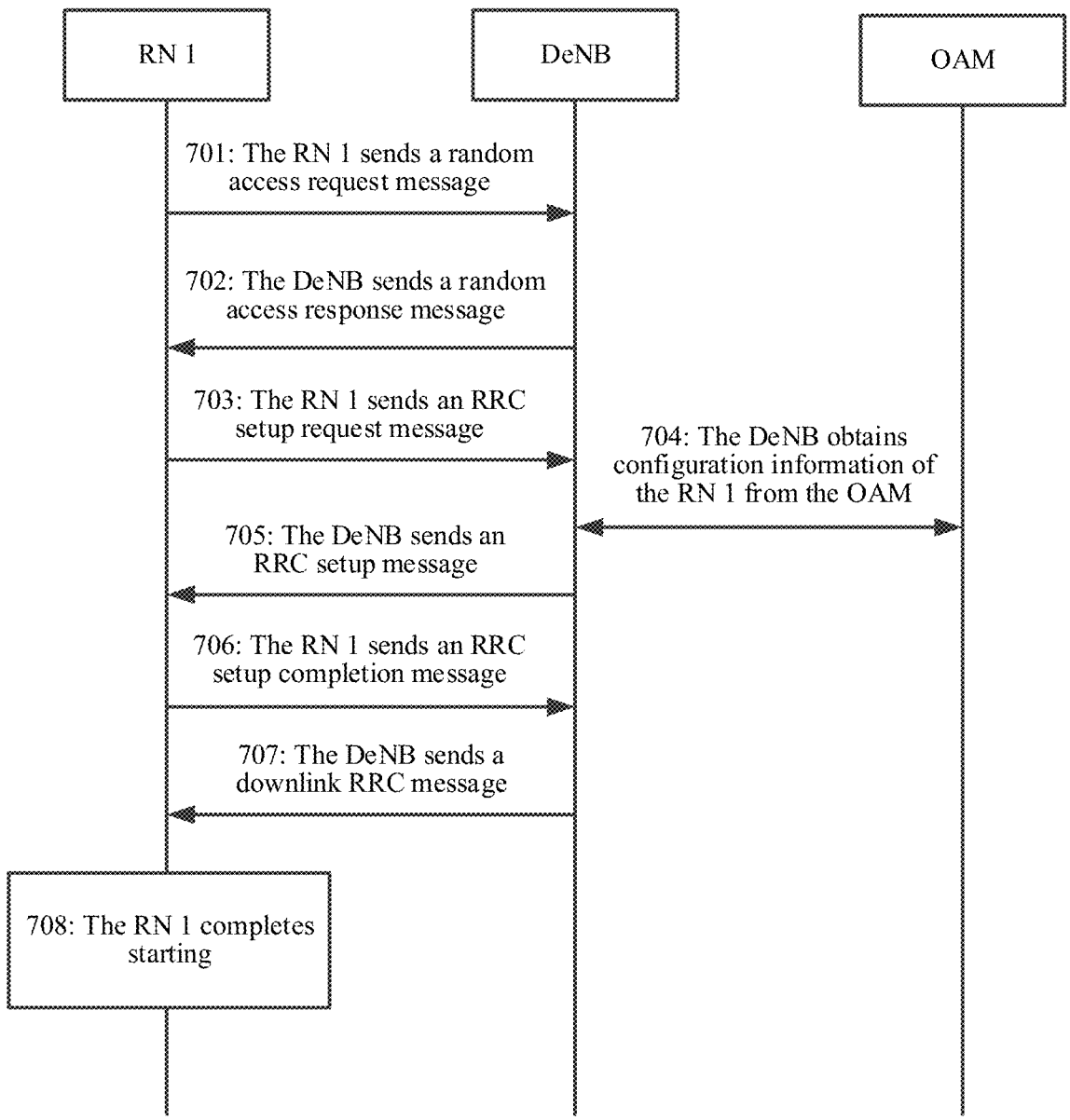
FIG. 7 is a schematic diagram of a process of starting an RN according to this application.

Based on the foregoing description, the following describes a process of starting a first device and a second device. As shown in FIG. 7, the process is as follows.

Operation 701: An RN 1 sends a random access request message.

The RN 1 selects one of one or more cells of a DeNB as a serving cell based on strength and/or quality of an interface radio signal of the DeNB or configured serving cell information. The RN 1 initiates a random access request in the cell.

Operation 702: The DeNB sends a random access response message.

The RN 1 receives the random access response message fed back by the DeNB, where the random access response message carries a resource required by the RN 1 for sending an RRC connection request.

Operation 703: The RN 1 sends an RRC setup request message.

The RN 1 sends the RRC connection request message or new signaling having a similar setup request function to the DeNB, where the request message includes one of the following information: identification information, that is, a random number (40 bits or other bits), used to identify an identity of an RN 2, or an (S-Temporary Mobile Subscriber Identity) S-TMSI of the RN 1; an access cause that may be used to indicate starting of the RN 1 or indication information that may be used to distinguish node access and terminal access, where the indication information is not limited to the access cause; an identifier of the access node/an identifier of a home node of an access user, where the information is used to help the DeNB identify which hop the RN is located in. For a relay node directly connected to the DeNB, an identifier of a home node of the relay node is DeNB id or id of a serving cell of the relay node on the DeNB, namely, an evolved universal terrestrial radio access network cell global identifier (ECGI) of the serving cell.

Operation 704: In one embodiment, the DeNB obtains configuration information of the RN 1 from OAM.

The DeNB obtains the configuration information of the RN 1 node from the OAM. The OAM may be a remote OAM or a local OAM. The DeNB may consider the RN 1 as one of cells of the DeNB, and then request configuration information for the cell. This operation may be performed before operation 705, or may be performed after operation 705.

The DeNB may alternatively generate the configuration information of the RN 1 node. In this case, operation 704 does not need to be performed.

Operation 705: The DeNB sends an RRC setup message.

The DeNB sends the RRC connection setup message or new signaling having a similar setup function to the RN. For the RN node, the DeNB may query the RN node for a radio capability of the RN node, and then the DeNB stores the radio capability of the multi-hop RN node served by the DeNB, and sets up a proper radio link for the RN based on the capability information. In one embodiment, because the radio link is responsible for a wireless backhaul function, the DeNB maintains that the backhaul link is in a persistent connection state, and does not actively release the backhaul link. The DeNB performs operations such as connection release and connection re-setup only when the backhaul link is unavailable, for example, a radio link failure occurs in the backhaul link.

After obtaining the configuration information of the RN 1 node before operation 705, the DeNB may send the configuration information to the RN 1 node in the RRC connection setup message or the new signaling having a similar setup function, and the RN 1 node configures a cell function of the RN 1 based on the configuration information. The configuration information includes a cell identifier, a system message, and the like. The configuration information may include: a global cell identifier (Cell Global Identifier, CGI); a physical cell identifier (Physical Cell Identity, PCI); key configuration information of a cell: a system (super) frame number, scheduling information of a system message, an access control enabling indication, a deployment mode, a system message change label, or downlink frequency information; access information of the serving cell or scheduling information of another system information block; radio public resource-related configuration information, a UE timer, a constant, or a UL frequency; cell selection and reselection or neighboring cell configuration information; access control information; ACB access information, EAB access information, or AB access information; and system time information. The RN 1 may configure the cell of the RN 1 based on the received configuration information.

In addition, the configuration information of the RN 1 node may be obtained and sent to the RN 1 by the DeNB, for example, in operation 707, after the RRC connection setup of the RN 1 is completed.

Operation 706: The RN 1 sends an RRC setup completion message.

The RN 1 sends the RRC connection setup completion message or new signaling having a similar setup confirmation function to the DeNB. In the message, in one embodiment, because the RN 1 is started as a node and has no NAS layer, the message may not include a NAS PDU.

When the DeNB obtains the configuration information of the RN 1 after operation 705, operation 707 and operation 708 need to be performed on the backhaul link. When the DeNB does not obtain the configuration information of the RN 1 after operation 705, operation 707 and operation 708 are not performed on the backhaul link.

Operation 707: The DeNB sends a downlink RRC message.

After the RN 1 completes the connection setup, the DeNB sends the configuration information that is obtained from the OAM and that is of the RN 1 serving as one of the cells of the DeNB to the RN 1 node by using one downlink RRC message, where the configuration information of the RN 1 may include a system message of the cell and the like, the included message is described in operation 705, and details are not described.

When a protocol stack structure is shown in FIG. 6b, in one embodiment, when NAS layer configuration is supported on the RN 1 and the NAS layer configuration is used for transmission of a backhaul link of the RN 1, an implementation method is as follows: The configuration information of the cell is transmitted from the OAM to an MME in an IP packet manner, and then the configuration information of the cell is transmitted to the DeNB from the MME in a NAS PDU manner. The DeNB sends the configuration information to the RN 1 by using a downlink transmission message.

Operation 708: The RN 1 completes starting.

The RN 1 configures a cell of the RN 1 based on the received configuration information and completes starting.

Figure 8:
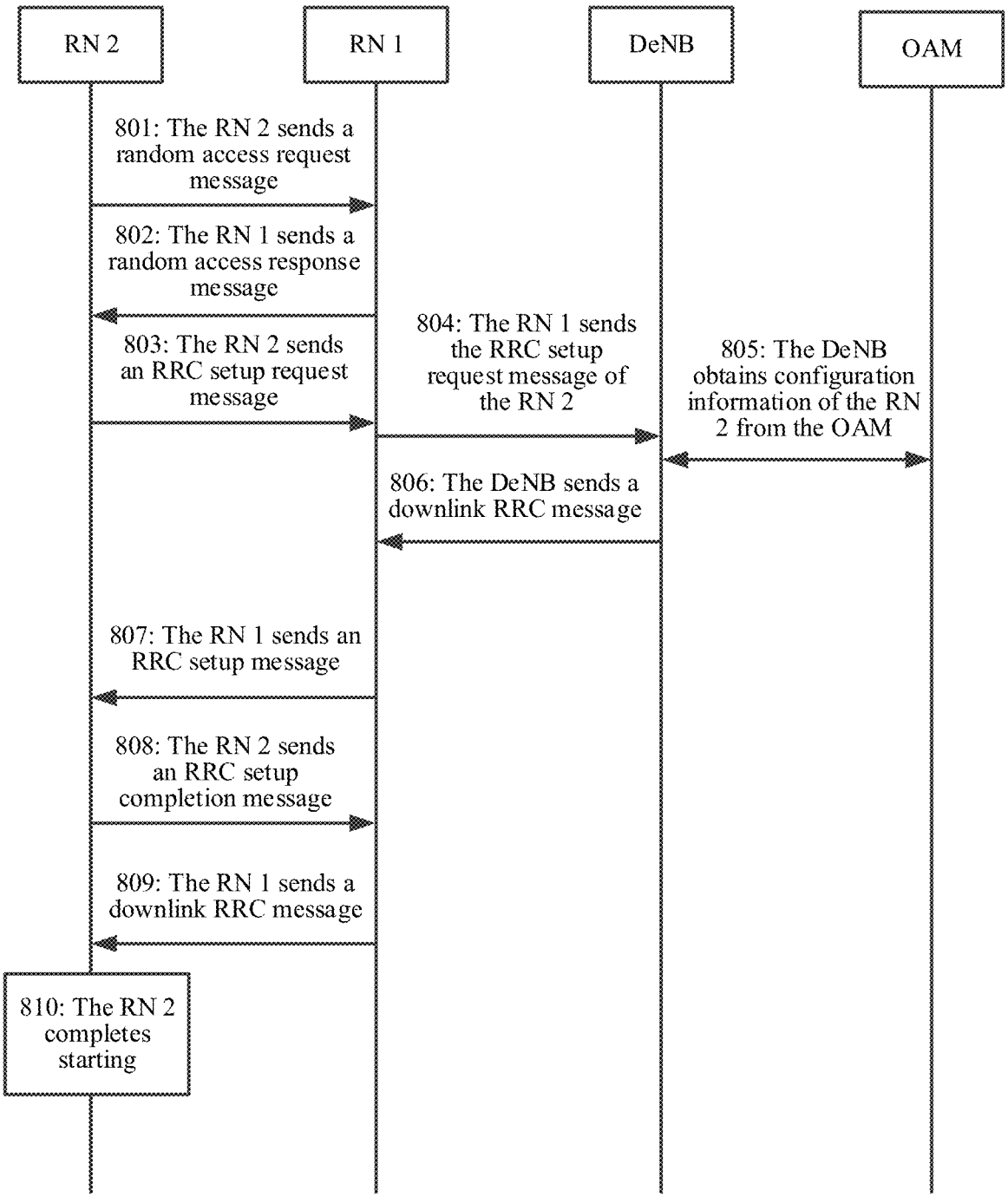
FIG. 8 is a schematic diagram of a process of starting an RN according to this application.

The process described in the foregoing operations is a process of starting the RN 1, and the following describes, by using a process shown in FIG. 8, a process of starting an RN 2 that accesses the RN 1. The process includes the following operations.

Operation 801: The RN 2 sends a random access request message.

The RN 2 selects one of one or more cells of the RN 1 as a serving cell based on strength and/or quality of an interface radio signal of the RN 1 or configured serving cell information, and sends the random access request message to the RN 1.

Operation 802: The RN 1 sends a random access response message.

The RN 2 receives the random access response message fed back by the RN 1, where the random access response message carries a resource required by the RN 2 for sending an RRC connection request.

Operation 803: The RN 2 sends an RRC setup request message.

The RN 2 sends the RRC connection request message or new signaling having a similar setup request function to the RN 1, where the request message includes one of the following information: identification information, that is, a random number (40 bits or other bits), used to identify an identity of the RN 2, or (S-Temporary Mobile Subscriber Identity) S-TMSI of the RN 1; an access cause that may be used to indicate starting of the RN 2 or indication information that may be used to distinguish node access and terminal access, where the indication information is not limited to the access cause; an identifier of the access node/an identifier of a home node of an access user, where the information is used to help the DeNB identify which hop the RN 2 is located in. For a relay node directly connected to the DeNB, an identifier of a home node of the relay node is a DeNB id or id of a serving cell of the relay node on the DeNB, namely, an evolved universal mobile telecommunications system terrestrial radio access network cell global identifier (ECGI) of the serving cell.

Operation 804: The RN 1 sends an uplink RRC message.

After receiving a connection setup request sent by the RN 2, the RN 1 identifies access of the RN 2 of a next hop based on a cause value or RN indication information. In this case, the RN 1 forwards a setup message of the RN 1 by using the uplink RRC message on a setup wireless backhaul link between the RN 1 and the DeNB. Alternatively, the RN 1 may obtain an access request of the RN 2 after an RRC setup completion message of the RN 2 is received. In this case, after receiving the connection setup completion message sent by the RN 2, the RN 1 identifies access of the RN 2 of a next hop based on a cause value or RN indication information. In this case, the RN 1 forwards a setup message of the RN 2 by using the RRC message on a setup wireless backhaul link between the RN 1 and the DeNB. The setup message, forwarded on the backhaul link, of the RN 2 includes the access cause, the identifier of the access node/ the identifier of the home node of the access terminal, and a cell identifier.

Operation 805: In one embodiment, the DeNB obtains configuration information of the RN 2 from OAM.

The DeNB obtains access request information of the RN 2 from the RN 1 node, and obtains the configuration information of the RN 2 node from the OAM. The OAM may be a remote OAM or a local OAM. The DeNB may consider the RN 2 as one of cells of the DeNB, and then request configuration information for the cell.

The DeNB may alternatively generate the configuration information of the RN 2 node. In this case, operation 805 does not need to be performed.

Operation 806: The DeNB sends a downlink RRC message.

The DeNB sends the configuration information of the RN 2 by using the downlink RRC message on the setup backhaul link between DeNB and the RN 1, where the configuration information of the cell includes a system message of the cell and the like, included content is described in the foregoing operation, and details are not described.

When a protocol stack structure is shown in FIG. 6b, in one embodiment, when NAS layer configuration is supported on the RN 1 and the NAS layer configuration is used for transmission of a backhaul link of the RN 1, an implementation method is as follows: The configuration information of the cell is transmitted from the OAM to an MME in an IP packet manner, and then the configuration information of the cell is transmitted to the DeNB from the MME in a NAS PDU manner. The DeNB sends the configuration information to the RN 1 by using a downlink transmission message.

Operation 807: The RN 1 sends an RRC setup message.

After receiving the configuration information, the RN 1 sends the RRC connection setup message or new signaling having a similar setup function to the RN 2. For the RN 2, the RN 1 may query the RN 2 node for a radio capability of the RN 2, and then the RN 1 stores the radio capability of the multi-hop RN served by the RN 1, and sets up a proper radio link for the RN 2 based on the capability information. Alternatively, the RN 1 reports the obtained radio capability of the RN 2 that is the next hop of the RN 1 to the DeNB for storage. When needing to obtain the radio capability of the RN 2 of the next hop, the RN 1 requests the radio capability from the DeNB. The RN 1 sets up a proper radio link for the RN 2 based on the capability information.

Because the radio link is responsible for a wireless backhaul function, the DeNB maintains that the backhaul link is in a persistent connection state, and does not actively release the backhaul link. The DeNB performs operations such as connection release and connection re-setup only when the backhaul link is unavailable, for example, a radio link failure occurs in the backhaul link.

The RN 1 may send the configuration information of the cell to the RN 2 in the RRC connection setup message or the new signaling having a similar setup function, and the RN 2 configures a cell function of the RN 2 based on the configuration information. The configuration information of the cell includes a cell identifier, a system message, and the like.

Operation 808: The RN 2 sends an RRC setup completion message.

The RN 2 sends the RRC connection setup completion message or new signaling having a similar setup confirmation function to the RN 1. In the message, because the RN 2 is started as a node and has no NAS layer, the message may not include a NAS PDU. If the RN 2 supports the NAS layer, the message may include a special NAS PDU used to describe a setup completion confirmation function of the RN 2.

Operation 809: The RN 1 sends a downlink RRC message.

After the RN 2 completes the RRC connection setup, the RN 1 sends the configuration information that is obtained from the DeNB and that is of the RN 2 serving as one of the cells of the RN 1 to the RN 2 node by using one downlink RRC message, where the configuration information of the RN 2 may include a system message of the cell and the like, the included message is described in the foregoing operation, and details are not described.

Operation 810: The RN 2 completes starting.

The RN 2 configures a cell of the RN 2 based on the received configuration information and completes starting.

To better manage a routing function of a plurality of relay nodes, in the processes of starting of the RN 1 and the RN 2, the DeNB further needs to maintain routing information of the RN 1 and the RN 2. In one embodiment, the DeNB may start to establish a routing table 1 for the RN 1 after operation 704 or operation 706. The DeNB may start to establish an update of the routing table 1 for the RN 1 after operation 805 or operation 809. The DeNB may start to establish a routing table 2 for the RN 2 after operation 806 or operation 808.

The routing information that can be maintained by the DeNB may mainly include the following information: a home node id, where the information is reported by an RN node during access or forwarded to the DeNB by an RN served by the DeNB, and is used for the DeNB to maintain hop count information of the RN. If the information about the home node id is the DeNB id or an id of a cell of a non-RN of the DeNB, the DeNB learns that the RN is an RN directly served by the DeNB, and is a two-hop RN, for example, the RN 1. If the home node id is an RN served by the DeNB, the DeNB learns that the RN is an RN of three or more hops, for example, the RN 2.

RN indication information: The information is used to indicate that the access is RN access or common UE access. The indication manner may be indicating by using a special cause value, for example, setting a cause value to RN access, or may be indicating by using one identifier, for example, 1 bit, where 1 indicates RN access, and 0 indicates UE access; or 0 indicates UE access, 1 indicates RN access. In another possible indication manner, if an RN indication identifier exists, the access is RN access. If the indicator field does not exist, the access is UE access.

RN node id: The information is obtained by the DeNB from configuration information of the OAM. If the RN node supports the NAS layer, as shown in FIG. 6, when the DeNB cannot directly obtain configuration information of the RN node from a NAS PDU, a base station obtains the information from updated cell configuration in an updated message from an MME to the DeNB. It is assumed that the RN node supports only one cell, and the RN node id is an evolved universal terrestrial radio access network cell global identifier of the cell, namely, ECGI information. In this application, it is assumed that an ECGI of the RN 1 is equal to an ECGI 1 and an ECGI of the RN 2 is equal to an ECGI 2.

Based on the information, the DeNB and an RN node of a previous hop may identify a multi-hop intermediate routing node.

RN UE id/UE id: The information is a C-RNTI allocated by the DeNB or the RN node of the previous hop when the DeNB or the RN serving as a UE identity accesses on the backhaul link. When the DeNB needs to maintain the routing information of the RN 2 serving as one of cells of the RN 1, the RN 1 needs to carry an allocated RN 2 UE id to the DeNB. When UE accesses a network, the RN 1 and the RN 2 need to carry a C-RNTI allocated by the RN 2 to the UE on the backhaul link to the RN node of the previous hop such as the RN 1 and a donor eNB such as the DeNB. In this application, it is assumed that a C-RNTI of the RN 1 is equal to a C-RNTI 1 and a C-RNTI of the RN 2 is equal to a C-RNTI 2. Based on the information, the DeNB and the RN node of the previous hop can identify a link of an interface. If one UE accesses a network, the UE id is a C-RNTI allocated to the UE in a serving cell of the UE. In this embodiment, it is assumed that the UE id is equal to a C-RNTI 3. When the radio link and the backhaul link do not change, the RN UE id and the UE id need to be carried only once, to establish routing information. After the links are updated, the information needs to be carried again to update the routing information.

Content of the routing table 1, established on the DeNB, of the RN 1 may be shown in a table 1, and indicates that the RN 1 is connected to the DeNB by using the wireless backhaul link.

TABLE 1

| Home node id | RN indication | RN node id | RN UE id/UE id |
|---|---|---|---|
| DeNB | RN | ECGI 1 | C-RNTI 1 |

Content of the routing table 2 established on the RN 2 may be shown in a table 2, and indicates that the RN 2 is connected to the RN 1 by using the wireless backhaul link.

TABLE 2

| Home node id | RN indication | RN node id | RN UE id/UE id |
|---|---|---|---|
| ECGI1 | RN | ECGI 2 | C-RNTI 2 |

After the DeNB completes configuration for the RN 2, the routing table 1 on the DeNB is updated to a table 3. The DeNB can learn that a node of a previous hop of the RN 2 is the RN 1 and a node of a previous hop of the RN 1 is the DeNB.

TABLE 3

| Home node id | RN indication | RN node id | RN UE id/UE id |
|---|---|---|---|
| DeNB | RN | ECGI 1 | C-RNTI 1 |
| ECGI1 | RN | ECGI 2 | C-RNTI 2 |

When one UE accesses the RN 2, the RN 2 maintains a routing table 3, to indicate that the UE accesses the RN 2. Content of accessing the RN 2 by the UE is shown in a table 4, where the UE id is assumed to be the C-RNTI 3.

TABLE 4

| Home node id | RN indication | RN node id | RN UE id/UE id |
|---|---|---|---|
| ECGI 2 | UE | NULL | C-RNTI 3 |

After the UE accesses a network, the routing table 2 is updated to a table 5, to indicate that the UE accesses the RN 2 and is connected to the DeNB via the RN 1.

TABLE 5

| Home node id | RN indication | RN node id | RN UE id/UE id |
|---|---|---|---|
| ECGI 1 | RN | ECGI 2 | C-RNTI 2 |
| ECGI 2 | UE | NULL | C-RNTI 3 |

After the UE accesses the network, the routing table 1 on the DeNB is updated to a table 6. The DeNB may learn that the UE accesses the DeNB via the RN 2 and the RN 1.

| Home node id | RN indication | RN node id | RN UE id/UE id |
|---|---|---|---|
| DeNB | RN | ECGI 1 | C-RNTI 1 |
| ECGI 1 | RN | ECGI 2 | C-RNTI 2 |
| ECGI 2 | UE | NULL | C-RNTI 3 |

Based on management of the foregoing routing information, data of different RNs may be correctly routed between the DeNB and RNs, to implement correct routing of data on a plurality of RNs.

Figure 9:
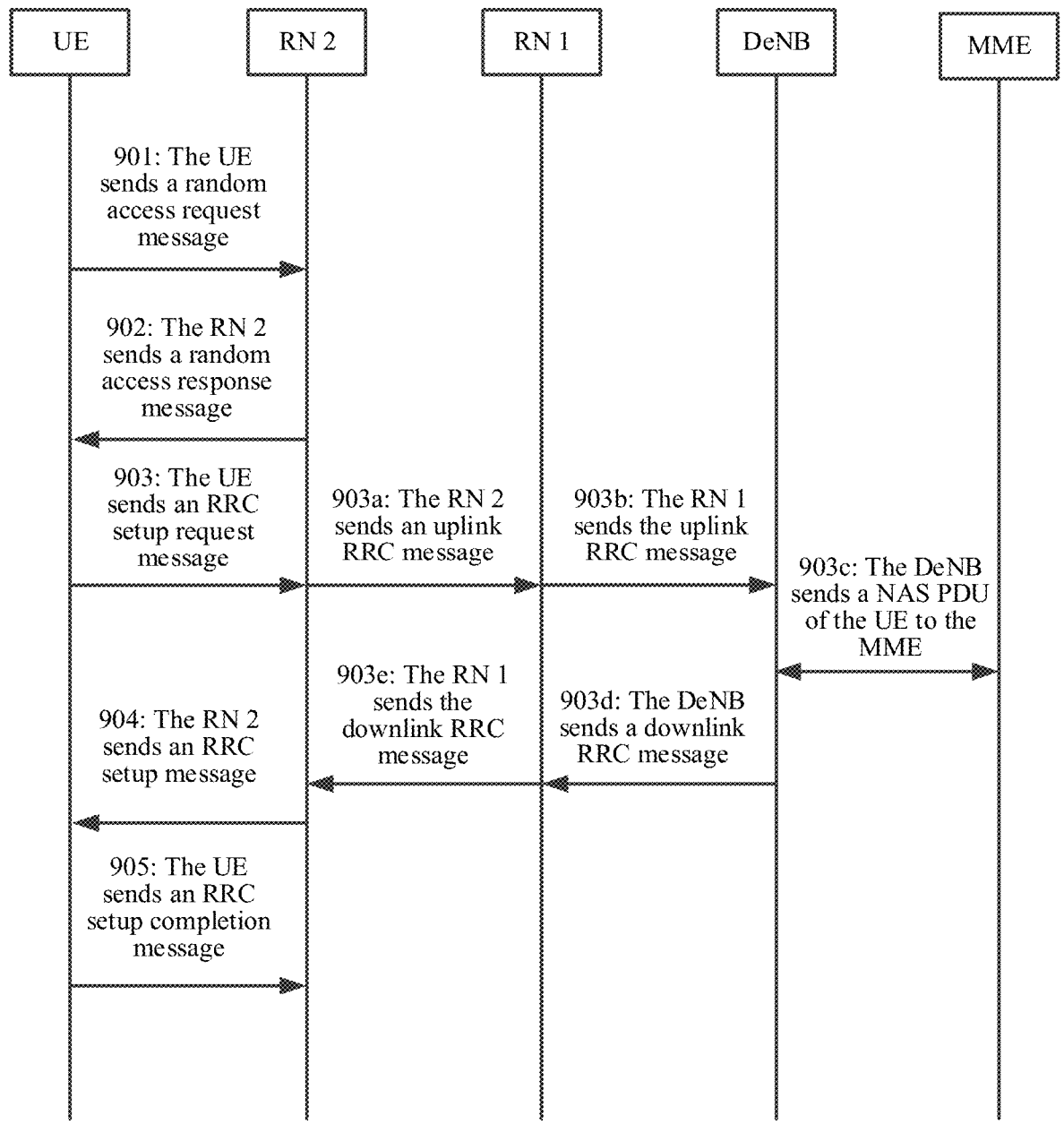
FIG. 9 is a schematic diagram of a process of accessing an RN by UE according to this application.

After the RN 1 and the RN 2 are started, the UE may access the RN 1 or the RN 2, and then send data to a network device by using the RN 1 or the RN 2. The following describes a process in which the UE accesses the RN 2. As shown in FIG. 9, the process includes the following operations.

Operation 901: The UE sends a random access request message.

The UE selects one of one or more cells of the RN 2 as a serving cell based on strength and/or quality of an interface radio signal of the RN 2, and initiates random access to the RN 2.

Operation 902: The RN 2 sends a random access response message.

The UE receives the random access response message fed back by the RN 2, where the random access response message carries a resource required by the UE for sending an RRC connection request.

Operation 903: The UE sends an RRC setup request message.

Operation 903 may further include operation 903a to operation 903e. The UE uses a resource scheduled by the RN 2 to initiate an RRC connection setup request, where the RRC connection setup message carries information such as a NAS id (40 bit (a random number) or an S-TMSI) of the UE, a setup cause value, and a capability of the UE. When the RN 2 needs to obtain other capability information of the UE, the RN 2 may send an uplink RRC message, for example, an uplink transmission message, on a wireless backhaul link that has been set up between the RN 2 and the RN 1, or may send the NAS id of the UE, the setup cause value, or uplink data of early transmission to the RN 1 by using newly defined RRC signaling. The RN 1 sends the uplink RRC message on a wireless backhaul link that has been set up between the RN 1 and a DeNB, and sends the NAS id of the UE, the setup cause value, or the uplink data of early transmission to the DeNB. The DeNB sends signaling to an MME to obtain the capability information of the UE. The DeNB sends the capability information of the UE to the RN 1 by using downlink RRC signaling, for example, new RRC signaling or a downlink transmission message. Then, the RN 1 sends the capability information of the UE to the RN 2 by using a downlink RRC message, and the RN 2 sends an RRC setup message to send the capability information of the UE to the UE.

Operation 904: The RN 2 sends the RRC setup message.

After obtaining the capability of the UE, the RN 2 sets up an RRC connection for the UE, and sends the RRC setup message to the UE. In this case, the capability information of the UE may be sent to the UE by using the RRC setup message.

Operation 905: The UE sends an RRC setup completion message.

If the UE does not support early data transmission, the UE may send a NAS PDU that needs to be transmitted and that is in the RRC setup completion message sent to the RN 2 to the RN 2 node, so that the RN 2 node sends the NAS PDU to the DeNB by using the RN 1.

The RN 2 may send a first RRC message to the RN 1, where the message includes first data and identification information. For a process, refer to operation 301. The first RRC message may be the uplink transmission message, or may be the newly defined RRC signaling, and may further include information such as the NAS id of the UE and the setup cause value. If the information has already been transmitted in operations 903*a* and 903*b*, the two pieces of information may not be included in this operation, or may be included in this operation. The first RRC message may further include a C-RNTI allocated by the RN 2 for the UE, and the C-RNTI is used for the RN 1 to update a routing table.

Operation 303: The first device receives the first RRC message.

In one embodiment, after receiving the first RRC message sent by the RN 2, the RN 1 may determine, based on identification information of the second device that is carried in the first RRC message, the DeNB of the RN 1 corresponding to the identification information, where an objective herein is to select a destination to which the first data carried in the first RRC message is to be sent.

In one embodiment, when the identification information in the first message is the identification information of the relay node, the first RRC message may further include a relay indication, and the relay indication is used to notify the network device and/or the donor eNB that the second device is a relay node. The relay indication may be a cause value in the process of starting the RN.

Operation 304: The first device sends a second RRC message.

When the RN 2 determines that the first data needs to be forwarded to the DeNB, the RN 2 forwards the first data and the identification information to the DeNB by using the second RRC message. For example, the second RRC message may be an uplink data transmission message.

After receiving the first data and the identification information, the DeNB initiates S1 initial UE information to an MME, and establishes a mapping relationship between an interface of the UE and S1 based on the received identification information. Parameters may include an RN node id, a UE id, and an S1AP id. The RN node id and the UE id are described in the foregoing process. The S1AP id indicates an MME UE S1AP ID or an eNB UE S1AP ID, or another ID that can identify a connection of the UE on an S1 interface.

When receiving one downlink NAS PDU on an S1AP connection of the MME, the DeNB selects a route of a next-hop RN for the UE based on routing table information and the established mapping relationship between the interface of the UE and the S1. The DeNB sends a downlink RRC message to the RN 1 on a radio link, where the RRC message may be a downlink transmission message, or may be newly defined RRC signaling. If the radio link is a backhaul link, an RN node id of an RN to which the downlink data packet needs to arrive, a UE id, and a DL NAS PDU from the MME are included. If the link is a wireless access link, the sent downlink transmission message includes neither the RN node id nor the UE id, but includes the DL NAS PDU from the MME.

The RN 1 searches for a local routing table based on the received RN node id and the received UE id, finds a corresponding interface link or a corresponding backhaul link, and sends the downlink RRC message to the link. The RRC message may be a downlink transmission message, or may be newly defined RRC signaling. If the radio link is a backhaul link, an RN node id of an RN to which the downlink data packet needs to arrive and a UE id are included. If the link is a wireless access link, the sent downlink transmission message includes neither the RN node id nor the UE id, but includes a DL NAS PDU from the MME. The RN 2 sends a downlink transmission message to the UE, where the downlink transmission message includes the NAS PDU from the MME.

After data transmission of the UE ends, the RN 2 may initiate a connection release message, and the RN 2 sends an RRC connection release request message to the serving node RN 1 of the RN 2, where the RRC connection release request message carries information about the UE id that needs to be released. The RN 1 forwards the connection release message to the DeNB, where the connection release message carries information about the RN node id and the UE id. The DeNB searches for a mapping relationship table between the UE and the S1 interface, finds a corresponding S1AP connection that needs to be released, and sends a release request to the MME, to request a release message from the MME.

The DeNB receives a release command from the MME. The DeNB sends an RRC release message to the RN 1, and the RN 1 sends the RRC release message to the RN 2, where the RRC release message carries an identifier of an RN node id and an identifier of a UE id of a link that needs to be released.

It should be noted that if the RN 2 first initiates RRC connection release, the node also needs to notify the serving node and the DeNB and the MME of the serving node to delete a corresponding backhaul link and a corresponding S1 connection. In this case, a name of an RRC message on the backhaul link may be changed to the RRC connection release, and the name of the RRC message is notification information instead of request information. A name of a release message on the S1 interface may also be changed from request information to notification information. After receiving the information, the serving RN node updates a routing table of the serving RN node, and the DeNB updates a routing table of the UE and a mapping relationship table of an interface of the DeNB and the S1 interface.

It can be learned from the foregoing embodiments that a first device receives a first RRC message sent by a second device, where the first RRC message includes first data and identification information, and then the first device sends the first data and the identification information to a donor eNB of the first device by using a second RRC message. Because the first device and the second device send data by using an RRC message, network functions of the first device and the second device are simplified, and data transmission efficiency is increased after a plurality of relay nodes access an NB-IoT network.

Figure 10:
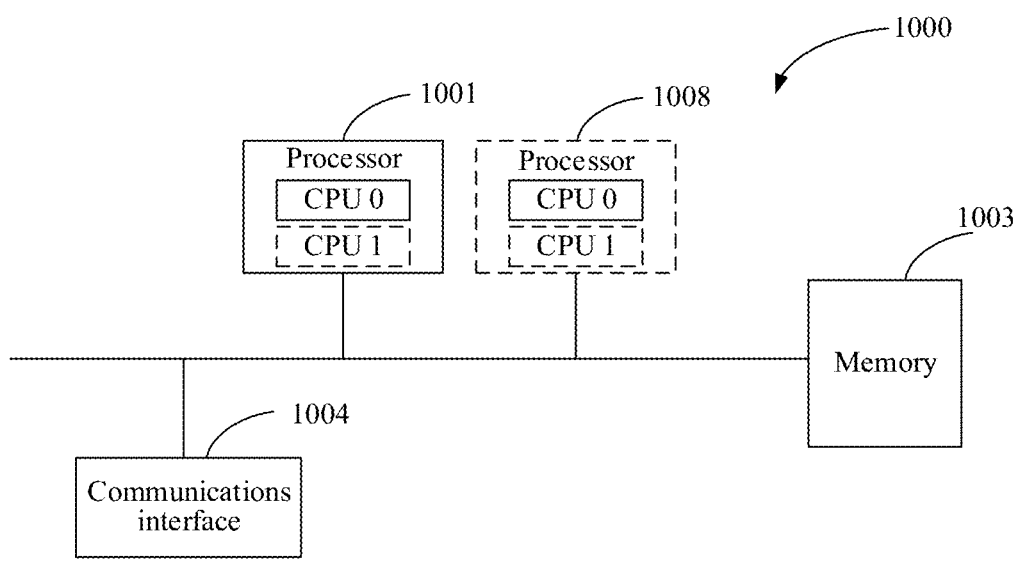
FIG. 10 is a schematic structural diagram of a transmission device according to this application.

Based on a same technical idea, FIG. 10 is a schematic structural diagram of a transmission device according to this application. The transmission device 1000 may be the first device or the second device shown in FIG. 3, or may be a chip and the like in the first device or the second device. The transmission device 1000 may be configured to perform the method described in the foregoing embodiments, and perform any transmission method in the foregoing embodiments. The transmission device 1000 includes at least one processor 1001 and at least one communications interface 1004. In one embodiment, the transmission device 1000 further includes a memory 1003.

The processor 1001 may be a general-purpose central processing unit (CPU), a microprocessor, an application-specific integrated circuit (ASIC), or one or more integrated circuits configured to control program execution in this application.

The memory 1003 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or another optical disc storage, optical disc storage (including a compact disc, a laser disc, an optical disc, a digital versatile disc, a Blu-ray disc, or the like), a magnetic disk storage medium or another magnetic storage device, or any other medium that can carry or store expected program code in an instruction or data structure form and can be accessed by a computer, however, this application is not limited thereto. The memory 1003 may exist independently, and is connected to the processor 1001 by using a bus. The memory 1003 may alternatively be integrated with the processor 1001.

The memory 1003 is configured to store application program code for executing this application, and execution is controlled by the processor 1001. The processor 1001 is configured to execute the application program code stored in the memory 1003.

In one embodiment, the processor 1001 may include one or more CPUs, for example, a CPU 0 and a CPU 1 in FIG. 10.

In one embodiment, the transmission device 1000 may include a plurality of processors, for example, the processor 1001 and a processor 1008 in FIG. 10. Each of these processors may be a single-core (single-CPU) processor, or may be a multi-core (multi-CPU) processor. The processor herein may be one or more devices, circuits, and/or processing cores configured to process data (for example, a computer program instruction).

For example, the first device in FIG. 3 may be the transmission device shown in FIG. 10, and the memory of the transmission device stores one or more software modules. The transmission device may implement the software modules by using the processor and the program code in the memory, to implement a process executed by the first device in any embodiment of this application.

The second device in FIG. 3 may be the transmission device shown in FIG. 10, and the memory of the transmission device stores one or more software modules. The transmission device may implement the software modules by using the processor and the program code in the memory, to implement a process executed by the second device in any embodiment of this application.

In this application, the transmission device may be divided into functional modules based on the foregoing method embodiments. For example, functional modules may be obtained through division based on corresponding functions, or two or more functions may be integrated into one processing module. The integrated module may be implemented in a form of hardware, or may be implemented in a form of a software functional module. It should be noted that, in this application, division into the modules is exemplary, is merely logical function division, and may be other division in an actual implementation.

Figure 11:
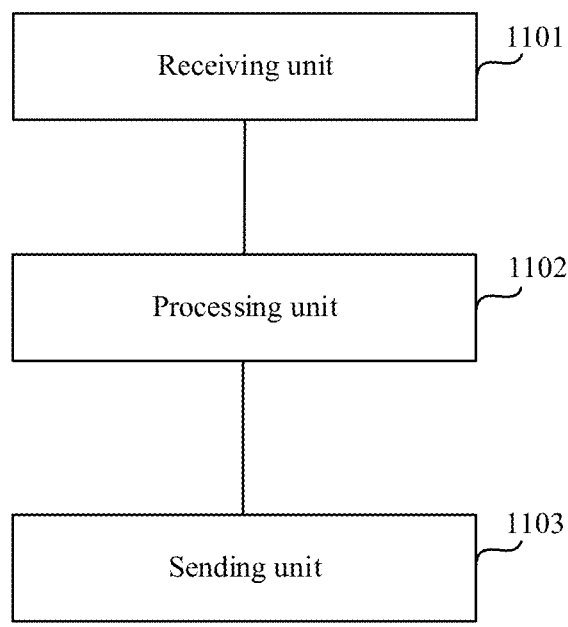
FIG. 11 is a schematic structural diagram of a transmission device according to this application.

For example, when functional modules are divided based on corresponding functions, FIG. 11 is a possible schematic structural diagram of a transmission device mentioned in the foregoing embodiments. When the transmission device is a first device or a second device, the transmission device includes a receiving unit 1101, a processing unit 1102, and a sending unit 1103.

Various variation manners and examples in the transmission method in the foregoing embodiments are also applicable to the transmission device in this embodiment. With reference to the foregoing detailed description of the transmission method, a person skilled in the art may clearly learn an implementation method of the transmission device in this embodiment. Therefore, for brevity of this specification, details are not described herein.

This application further provides a communications system, including a first device, a second device, and a donor eNB, where the first device is a first relay node that accesses the donor eNB, and the second device is the second relay node or a terminal device;

the second device obtains first data and identification information, where the first data is data to be sent to a network device, the identification information is identification information of the terminal device or identification information of the relay node; and the second device sends a first RRC message to the first device, where the first RRC message includes the first data and the identification information; and the first device receives the first RRC message sent by the second device, and sends the first data and the identification information to the donor eNB of the first device by using a second RRC message.

This application further provides a communications system, including a first relay node, a plurality of second relay nodes, a terminal device, and a donor eNB; where the terminal device accesses the first relay node after accessing the plurality of cascaded second relay nodes; and the first relay node is connected to the donor eNB.

This application further provides a computer storage medium, configured to store a computer software instruction used by the transmission device shown in FIG. 10 or FIG. 11. The computer software instruction includes program code designed for performing the foregoing method embodiment.

This application further provides a computer program product, where the computer program product includes a computer software instruction, and the computer software instruction may be loaded by using a processor, to implement the method in the foregoing method embodiment.

The foregoing descriptions are merely implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A transmission method comprising:
receiving, by a first device, a first radio resource control (RRC) message sent by a second device, wherein the first RRC message comprises first data and identification information, the first data to be sent to a network device, the first device is a first relay node that accesses a donor eNB, the second device is a second relay node or a terminal device, and the identification information is identification information of the second relay node; and
sending, by the first device, the first data and the identification information to the donor eNB of the first device by using a second RRC message, wherein before the sending, by the first device, the first data and the identification information to the donor eNB of the first device by using a second RRC message, determining, by the first device based on the identification information, the donor eNB of the first device corresponding to the identification information.

2. The method according to claim 1, wherein the first data is a non-access stratum protocol data unit (NAS PDU) sent by the terminal device to the network device.

3. The method according to claim 1, wherein before the receiving, by a first device, a first RRC message sent by a second device, the method further comprises:
determining, by the first device, a cell of the donor eNB as a serving cell based on strength and/or quality of an interface radio signal of the donor eNB or configured serving cell information;
initiating, by the first device, random access to the serving cell to set up an RRC connection to the donor eNB; and
receiving, by the first device, configuration information sent by the donor eNB, and configuring a cell of the first device based on the configuration information.

4. The method according to claim 1, wherein before the receiving, by a first device, a first RRC message sent by a second device, the method further comprises:
receiving, by the first device, an RRC connection request message initiated by the second device, and setting up an RRC connection to the second device.

5. The method according to claim 1, wherein, when the identification information is the identification information of the first relay node, the first RRC message further comprises a relay indication, and the relay indication is used to notify the network device and/or the donor eNB that the second device is a relay node.

6. A transmission method comprising:
obtaining, by a second device, first data and identification information, wherein the first data is to be sent to a network device, the identification information is identification information of a second relay node, and the second device is the second relay node or a terminal device;
sending, by the second device, a first radio resource control (RRC) message to a first device, wherein the first RRC message comprises the first data and the identification information, and the first device is a first relay node that accesses a donor eNB; and
sending, by the first device, the first data and the identification information to the donor eNB of the first device by using a second RRC message, wherein before the sending, by the first device, the first data and the identification information to the donor eNB of the first device by using a second RRC message, determining, by the first device based on the identification information, the donor eNB of the first device corresponding to the identification information.

7. The method according to claim 6, wherein when the second device is the terminal device, the obtaining, by a second device, the first data comprises:
obtaining, by the second device, the first data generated by the terminal device.

8. A transmission device comprising:
a processor;
a memory;
a receiver; and
a transmitter; wherein,
the memory is configured to store a software program;
the receiver is configured to receive a first radio resource control (RRC) message sent by a second device, wherein the first RRC message comprises first data and identification information, the first data is to be sent to a network device, the transmission device is a first device, the first device is a first relay node that accesses a donor eNB, the second device is a second relay node or a terminal device, the second device accesses the first device, and the identification information is identification information of the second relay node; and
the transmitter is configured to send the first data and the identification information that are received by the receiver to the donor eNB of the first device by using a second RRC message, wherein the processor is configured to: before the transmitter sends the first data and the identification information that are received by the receiver to the donor eNB of the first device by using the second RRC message, determine, based on the identification information received by the receiver, the donor eNB of the first device corresponding to the identification information.

9. The transmission device according to claim 8, wherein the first data is a non-access stratum protocol data unit (NAS PDU) sent by the terminal device to the network device.

10. The transmission device according to claim 8, wherein the processor is further configured to: determine a cell of the donor eNB as a serving cell based on strength and/or quality of an interface radio signal of the donor eNB or configured serving cell information; and initiate random access to the serving cell to set up an RRC connection to the donor eNB;
the receiver is further configured to receive configuration information sent by the donor eNB; and
the processor is further configured to configure a cell of the transmission device based on the configuration information received by the receiver.

11. The transmission device according to claim 8, wherein before the receiver receives the first RRC message sent by the second device, the receiver is further configured to receive an RRC connection request message initiated by the second device; and
the processor is further configured to set up an RRC connection to the second device.

12. The transmission device according to claim 8, wherein, when the identification information is the identification information of the first relay node, the first RRC message further comprises a relay indication, and the relay indication is used to notify the network device and/or the donor eNB that the second device is a relay node.

13. A transmission device comprising:
a transmitter; and
a processor, wherein,
the processor is configured to obtain first data and identification information, wherein the first data is to be sent to a network device, the identification information is identification information of a second relay node, and the transmission device is the second relay node; and
the transmitter is configured to send a first radio resource control (RRC) message to a first device, wherein the first RRC message comprises the first data and the identification information that are obtained by the processor, and the first device is a relay node that accesses a donor eNB, by sending, by the first device, the first data and the identification information to the donor eNB of the first device by using a second RRC message, wherein before the sending, by the first device, the first data and the identification information to the donor eNB of the first device by using the second RRC message, the first device determines based on the identification information, the donor eNB of the first device corresponding to the identification information.

14. The transmission device according to claim 13, further comprising a receiver, wherein
the processor controls the receiver to receive the first data sent by a terminal device.

15. A communications system comprising:
a first device;
a second device; and
a donor eNB, wherein the first device is a first relay node that accesses the donor eNB, and the second device is a second relay node,
wherein, the second device obtains first data and identification information, wherein the first data is to be sent to a network device, the identification information is identification information of the second relay node, and the second device sends a first radio resource control (RRC) message to the first device, wherein the first RRC message comprises the first data and the identification information, and
wherein, the first device receives the first RRC message sent by the second device, and sends the first data and the identification information to the donor eNB of the first device by using a second RRC message, wherein before the sending, by the first device, the first data and the identification information to the donor eNB of the first device by using a second RRC message, determining, by the first device based on the identification information, the donor eNB of the first device corresponding to the identification information.

* * * * *